United States Patent Office 3,330,826
Patented July 11, 1967

3,330,826
PROCESS FOR THE PRODUCTION OF DERIVATIVES OF PHENOTHIAZINE AND NEW DERIVATIVES
Josef Schmitt, L'Hay-les-Roses, Seine, France, assignor to Etablissements Clin-Byla (Société Anonyme), Paris, France, a company of France
No Drawing. Continuation of application Ser. No. 744,332, June 25, 1958. This application June 6, 1962, Ser. No. 200,319
Claims priority, application France, July 6, 1956, 57,406
28 Claims. (Cl. 260—243)

This application is a continuation of my copending application Ser. No. 744,332, filed June 25, 1958, which in turn is a continuation-in-part of my copending applications Ser. No. 575,005, filed Mar. 30, 1956, Ser. No. 660,031, filed May 20, 1957, and Ser. No. 667,710, filed June 24, 1957, the last being in turn a continuation-in-part of my prior application Ser. No. 663,916, filed June 6, 1957, all now abandoned.

The therapeutic importance of chlorpromazine (3-chloro-N-γ-dimethylaminopropyl-phenothiazine) is well known in narcosis, analgesia and local anestheseia and also by reason of its hypothermic, anti-emetic, adrenolytic and anti-shock properties.

This compound forms part of a series of N-dimethyl-amino-alkylphenothiazines, including those which carry, in the 3-position (the numbering corresponding here and throughout the specification and claims to Beilstein nomenclature), a substituent which is not affected by the action of alkaline agents, such as sodium amide, sodium, sodium hydride, and anhydrous caustic soda, employed according to classic processes for substituting a dimethylamino-alkyl group on the nitrogen atom of the phenothiazine.

This method of chain grafting in an alkaline medium seems a priori little incompatible with the presence of such substituents as —OH, —CHO, —CO—CH₃ and —CO—C₂H₅.

Now, it would be, a priori, and it is, indeed, as will be seen later on, profitable to prepare derivatives of N-aminoalkyl-, particularly of N-tertiary-aminoalkyl-, phenothiazines carrying such substituents, particularly in the 3-position.

The present invention has for an object, first of all, a process which permits of the preparation of such 3-substituted derivatives and which, furthermore, is also suitable for the preparation of the derivatives of phenothiazine first mentioned; this process, therefore, has a very wide application and is consequently of considerable interest, particularly by reason of the fact that it opens up a new field of investigation and, at the same time, provides a new approach to compounds of the type of chlorpromazine or of the type of promethazine (N-β-dimethylamino-propyl-phenothiazine).

The process essentially consists in converting a phenothiazine into an aminoalkyl ester of phenothiazine N-carboxylic acid, and then in decarboxylating this ester in order to bring about the direct union of the nitrogen atom of the phenothiazine to the aminoalkyl radical.

According to a preferred method of procedure, the decarboxylation is effected by a simple heat-treatment, if desired in the presence of a catalyst; in particular, the ester can be distilled in a vacuum; one can also proceed by heating in a suitable solvent, such a decahydronaphthalene.

The process of the present invention is based upon the following surprising discovery:

It is known that ordinary urethane, ethyl carbamate, decomposes under the influence of heat, at about 200° C. with liberation of ethyl alcohol and cyanic acid which is isolated in the form of its trimer, cyanuric acid.

The applicant has found that the γ-dimethylamino-propyl ester of 3-methoxy phenothiazine N-carboxylic acid (which compound is itself not very active in inducing narcosis, and which is also an urethane), when distilled in vacuo at temperatures above 200° C. most surprisingly loses a molecule of carbon dioxide and changes into 3-methoxy-N-γ-dimethylaminopropyl-phenothiazine, the activity of which is comparable with that of the analogous 3-chloro-compound (chlorpromazine); the decarboxylated compound thus obtained has, by the way, been found to be identical with the 3-methoxy-N-γ-dimethylamino-propyl phenothiazine prepared by the action of γ-dimethyl-amino-propyl chloride upon 3-methoxy phenothiazine in an alkaline medium.

It is pointed out that certain tertiary-aminoalkyl esters of phenothiazine N-carboxylic acid are already known (Dahlbom, Acta Chemical Scandinavia, volume VII, 1953, pages 879–884) and that, amongst them, are compounds which possess a high spasmolytic and nicotinolytic activity.

The invention comprises, further, by way of new industrial products, certain tertiary-aminoalkyl esters of phenothiazine N-carboxylic acids having a substituent in the 3-position, particularly a substituent which is sensitive to the action of alkaline agents. These are more especially the γ-dimethyl-aminopropyl esters of 3-methoxy-, 3-acetyl- and 3-propionyl-phenothiazine N-carboxylic acids, and the γ-diethylaminopropyl esters of 3-acetyl- and 3-propionyl phenothiazine N-carboxylic acid, and the β-dimethylaminoethyl ester of 3-acetyl-phenothiazine N-carboxylic acid, as well as "salts of addition" of acids, particularly the hydrochlorides and oxalates, of these basic esters and the corresponding chlorides of acids of the 3-substituted N-carboxy phenothiazines. It also includes the γ-dimethyl-aminopropyl ester of phenothiazine N-carboxylic acid, as well as its hydrochloride.

Furthermore, the invention includes the preparation of the phenothiazine N-carboxylic acid chlorides in question by the action of phosgene upon the phenothiazine carrying the desired substituent, and the preparation of the esters by the action of the appropriate tertiary-amino alcohol upon this acid chloride.

The present invention also includes, by way of novel industrial products, the N-tertiary-aminoalkyl-phenothiazines which carry, in the 3-position, a substituent which is sensitive to the action of alkalis, particularly 3-acetyl and 3-propionyl-N - γ - dimethylamino-propyl phenothiazines, the 3-acetyl- and 3-propionyl-N-γ-di-ethylamino-propyl phenothiazine and the 3-acetyl-N-β-dimethyl-aminoethyl phenothiazine, their "salts of addition" of acids, particularly their oxalates and maleates, their quaternary derivatives, particularly the iodomethylate of 3-acetyl-N-γ-dimethylaminopropyl phenothiazine. It includes, finally the 3-α-hydroxy-ethyl N-γ-dimethylamino-propyl phenothiazine and its salts, particularly its acid oxalate.

Amongst the novel N-tertiary-aminoalkyl phenothiazines, the 3-acetyl-N-γ-dimethylaminopropyl phenothiazine occupies an exceptional place in the sense that, due to its powers of narcosis and of local anaesthesia, by its antiemetic power, by its hypothermic power and by its lowering depressive effect upon the nerve centres it displays, used alone, an hypnotic action which chlorpromazine does not have. It is noted, moreover, that experimental animals having received this phenothiazine return to their normal state more quickly than in the case where chlorpromazine has been administered, so that it may be concluded that its elimination takes place more quickly than that of chlorpromazine.

I have further found that the acid maleate of 3-acetyl-N-γ-dimethylaminopropyl phenothiazine is desirable for therapeutic administration and is easily obtainable in crystalline form. However other acid addition salts from 3-acetyl-N-γ-dimethylaminopropyl phenothiazine and other pharmaceutically acceptable acids, for example hydrochloric acid, phosphoric acid, sulphuric acid, oxalic acid, fumaric acid, succinic acid, citric acid, tartaric acid, gluconic acid may also be employed.

Pharmacodynamic tests effected with the oxalate and with the maleate of the 3-acetyl-N-γ-dimethylaminopropyl phenothiazine have led to the following results:

In the case of the mouse, the acute toxicity of the oxalate, administered intravenously, is analogous to that of chlorpromazine and that of the maleate is less; the chronic toxicity (on sub-cutaneous administration) of the oxalate and that of the maleate are both lower than that of the chlorpromazine.

The depressive action, the narcosis, the hypothermic action, the local anaesthesia and the anti-emetic action are all at least equal, and mostly, greater than those of the chlorpromazine.

Clinical experience so far effected in surgery (pre- or post-operational administration), in neuro-psychiatry and in dermatology (anti-puriginous action) has confirmed, as a whole the superiority of the 3-acetyl-N-γ-dimethylaminopropyl phenothiazine over chloropromazine; there has been noted, in particular, a much better tolerance, and a complete absence of the troubles (palpitations, dryness of the mouth) frequent in the other known neuroplegics.

The following examples illustrate the manner in which the invention may be carried into effect:

EXAMPLE 1

*Chloride of acetyl-3 phenothiazine N-carboxylic acid.*—As raw material there is used 3-acetyl-phenothiazine, melting point 188-189° C.

In an autoclave there are placed 70 g. of 3-acetyl-phenothiazine and 245 cc. of 20% solution of phosgene in toluene, and this is heated in an electric furnace at 110-115% C. whilst stirring, for an hour and a half. The autoclave is removed from the furnace and cooled rapidly. After releasing the internal pressure, the toluene solution is filtered, and the autoclave is washed with toluene. The combined toluene solutions are evaporated to dryness and the gummy black residue extracted three times with 250 cc. of ether under reflux. After concentration of the ethereal solutions to a very small volume, crystallisation takes place. The crystals are filtered off and dried. There is recovered 70 g. (yield 80%) of a beige powder which can be used directly for conversion into the ester.

Re-crystallised from ethyl acetate, the acid chloride melts at 116-117° C.

EXAMPLE 2

*Hydrochloride of γ-dimethylaminopropyl ester of 3-acetyl-phenothiazine N-carboxylic acid.*—In a flask provided with a calcium chloride guard tube, there are placed 30 g. of the acid chloride of 3-acetyl-phenothiazine N-carboxylic acid prepared according to the preceding example, and 11 g. (5% excess) of γ-dimethylamino propanol in 100 cc. of anhydrous acetone (instead of acetone, another anhydrous organic solvent may be employed, such as benzene). The whole is maintained under reflux over-night. There is formed a clear, beige precipitate of the hydrochloride of the γ-dimethylaminopropyl ester of 3-acetyl-phenothiazine N-carboxylic acid. This is filtered, washed with ether and dried. The yield is 30 g.

Re-crystallised from absolute ethanol, this hydrochloride melts at 213-215° C. with decomposition.

EXAMPLE 3

(a) *3-acetyl-N-γ - dimethylaminopropyl phenothiazine.*—30 g. of the hydrochloride of the basic ester prepared according to Example 2 are dissolved in water and it is decomposed by means of 10 N sodium hydroxide solution. The base (γ-dimethylaminopropyl ester of 3-acetyl-phenothiazine N-carboxylic acid) is extracted by means of ether, the ethereal solution is washed with water and dried over sodium sulphate.

After elimination of the ether on a water-bath, 21 g. of a red oil are obtained which is dissolved in 42 cc. of decahydronaphthalene (instead of decahydronaphthalene, there may be used in the same quantity, other solvents, such as 1,3-dimethoxybenzene, quinolin or collidine); the solution is refluxed until no more carbon dioxide is given off.

After cooling, ether is added and the solution is extracted by means of aqueous hydrochloric acid. The hydrochloric acid solution is decomposed by means of 10 N sodium hydroxide solution and the base is extracted with ether. The ethereal solution is washed with water and dried over sodium sulphate. After elimination of the solvent, 16 g. of an orange-yellow oil are obtained. Calculated on the acid chloride, the yield is 50% and calculated on the hydrochloride of the basic ester, it amounts to 78%.

(b) *Oxalate of the phenothiazine specified under (a).*—8 g. of the phenothiazine are dissolved in 80 cc. of absolute ethanol and to the solution there is added a solution of 3.1 g. of oxalic acid in 31 cc. of absoulte ethanol. This is heated whilst stirring, so that it may be well mixed and is allowed to crystallise over-night. The crystallised product, which is a pale yellow colour, is filtered and is recrystallised from methyl alcohol. Thus 9.2 (yield 90%) of the oxalate, crystals of pale yellow colour, are obtained, their melting point is 187-189° C. (with decomposition).

Results of the analysis:

Calculated for $C_{19}H_{22}ON_2S$, $C_2O_4H_2$: C, 60.57%; H, 5.76%; N, 6.73%; S, 7.69%. Found: C, 60.4%; H, 5.9%; N, 6.82%; S, 8.02%.

(c) *Maleate of the phenothiazine specified under (a).*—10 g. of the phenothiazine are dissolved in 100 cc. of ethyl acetate and a solution of 3.9 g. (10% excess) of maleic acid in 40 cc. of ethyl acetate is added. This is brought to boiling point and allowed to crystallise slowly. The crystallised product is filtered and washed with the minimum of ethyl acetate. Thus 12.2 g. (yield 89%) of yellow flakes, melting at 136-137° C. are obtained.

Results of the analysis:

Calculated for $C_{19}H_{22}ON_2S$, $C_4H_4O_4$: C, 62.44%; H, 5.88%; N, 6.33%; S, 7.23%. Found: C, 62.8%; H, 5.4%; N, 6.12%; S, 6.95%.

(d) *Oxime of phenothiazine specified under (a).*—In an Erlenmeyer flask there are placed 6.5 g. (0.02 gram molecule) of 3-acetyl-N-γ-dimethylaminopropyl phenothiazine, and there are added 2.8 g. (0.04 gram molecule) of hydroxylamine hydrochloride in 56 cc. of water. The mixture is heated to boiling point during a quarter of an hour and, to the yellow-orange solution thus formed, there are added 4 cc. of 10 N sodium hydroxide solution. A cloudy, light-yellow appears with the beginning of precipitation. This is boiled for 5 minutes and 2 cc. of 10 N sodium hydroxide solution are added. An abundant precipitate is formed which is filtered after cooling; it is washed and water and dried on paper. The product is recrystallised from ethyl acetate and, from the start, one obtains 5.5 g. of colourless "needles" melting at 157-158° C. By concentration of the mother-liquor further crystals are obtained so that, in all, the yield is substantial.

Results of the analysis:

Calculated for $C_{19}H_{23}ON_3S$: C, 66.86%; H, 6.75%; N, 12.31%; S, 9.39%. Found: C, 67.1%; H, 6.1%; N, 12.26%; S, 9.02%.

(e) *Iodomethylate of the phenothiazine specified under* (a).—5 g. of the phenothiazine are dissolved in 15 cc. of absolute ethanol, then there are added to the solution 2 cc. of methyl iodide dissolved in 8 cc. of absolute ethanol and the solution then allowed to crystallise. The yellow precipitate is filtered, washed with ethanol and ether and re-crystallised from absolute ethanol. Thus, 6.5 g. of small, pale-yellow crystals of the iodomethylate of 3-acetyl-N-γ-dimethylaminopropyl phenothiazine melting at 99–101° C. are obtained.

Results of the analysis:

Calculated for $C_{20}H_{25}ON_2SI$: C, 51.28%; H, 5.34%; N, 5.98%; S, 6.84%; I, 27.12%. Found: C, 51.4%; H, 5.4%; N, 5.8%; S, 6.75%; I, 26.4%.

(f) *3 - α - hydroxy-ethyl - N - γ - dimethylaminopropyl-phenothiazine and its oxalate*

In a three-necked flask, provided with a mechanical stirring device with a mercury seal, a condenser, a tube for introduction of liquid and an inlet for nitrogen, there are placed 0.5 g. of lithium-aluminum hydride and 50 cc. of anhydrous ether; and a solution of 5 g. of 3-acetyl-N-γ-dimethylaminopropyl phenothiazine in 50 cc. of anhydrous ether is added gradually.

The solution becomes discoloured and, when the introduction has been terminated, it is allowed to reaction for a quarter of an hour. Ethyl acetate is then added drop by drop to decompose the excess hydride, then dilute sodium hydroxide solution is added until the alumina precipitate is dissolved. Decanting follows, then extraction by ether and washing with water. After drying of the ethereal solution and distillation, there is obtained a quantitative yield of 5 g. of pale, red oil.

By treating this oil in acetone with oxalic acid and re-crystallisation of the product from acetone, the oxalate is obtained which melts at 139–141° C.

Results of the analysis:

Calculated for $C_{19}H_{24}ON_2S$, $C_2O_4H_2$: C, 60.28%; H, 6.22%; N, 6.70%; S, 7.65%. Found: C, 60.6%; H, 6.7%; N, 6.55%; S, 7.29%.

There has also been prepared the hydrochloride of the dinitro-2.4 phenylhydrazone of the phenothiazine specified under (a) and the phenylhydrazone itself; the hydrochloride is in the form of small, dark-red crystals, melting above 265° C. and the phenylhydrazone in the form of small, dark garnet-red crystals melting at 164–168°C.

EXAMPLE 4

By proceeding according to Example 1, but starting from 3-methoxy-phenothiazine, the acid chloride of 3-methoxyphenothiazine N-carboxylic acid is prepared (colourless prisms, melting at 96–97° C. after re-crystallisation from cyclohexane) and, starting from the latter, proceeding according to Examples 2 and 3, there are obtained, successively:

(a) The hydrochloride of the γ-dimethylaminopropyl ester of 3-methoxy-phenothiazine acid, (b) The free ester itself (brown roseate oil), (c) The oxalate of this ester (colourless crystals melting at 159–160° with decomposition), (d) The 3-methoxy-N-γ-dimethylaminopropyl phenothiazine (by simple vacuum distillation of the ester (b)), a roseate oil distilling at 225–230° C. under 0.4 mm. Hg, (e) The oxalate of the phenothiazine (d) which, after recrystallisation from ethonal, is in the form of colourless small plates melting at 180–181° C.

EXAMPLE 5

By proceeding as in Example 4(b) but by replacing the γ-dimethylaminopropanol by β-dimethylaminoethanol and the acid chloride of 3-methoxy-phenothiazine N-carboxylic acid by that of 3-acetyl-phenothiazine N-carboxylic acid, there is obtained the hydrochloride of the β-dimethylaminoethyl ester of the 3-acetyl-phenothiazine N-carboxylic acid which, after purifying, is in the form of white crystals melting at about 246° C. (with decomposition).

The basic ester itself, isolated by treatment of the hydrochloride with sodium hydroxide, is a brown-reddish oil.

By treating this basic ester as has been described in Example 3(a), 3-acetyl-N-β-dimethylaminoethyl phenothiazine is obtained in the form of a yellow-orange oil; its oxalate is in the form of golden-yellow prisms melting at 196–198° C. (with decomposition).

EXAMPLE 6

Proceeding according to the preceding examples and starting from the acid chloride of 3-acetyl-phenothiazine N-carboxylic acid, there are prepared successively the hydrochloride of the γ-diethylaminopropyl ester of the 3-acetyl-phenothiazine N-carboxylic acid, said ester itself (beige powder melting at 178–179° C. with decomposition, after recrystallisation from isopropanol), the 3-acetyl-N-γ-diethylaminopropyl phenothiazine (orangy-red oil boiling at 225–235° C. under 0.3 mm. Hg) and the oxalate of this base, which melts at 146–148° C. and is in the form of yellow prisms.

EXAMPLE 7

One starts from the acid chloride of 3-propionylphenothiazine N-carboxylic acid, prepared according to the instructions of Example 1 which is, after re-crystallisation from ethyl-acetate, in the form of colourless prisms which melt at 156–157° C.

By treating this acid chloride with excess γ-diethylamino-propanol, according to Example 2, there is obtained, in the form of yellow crystals, the hydrochloride of the γ-diethylaminopropyl ester of the 3-propionyl-phenothiazine N-carboxylic acid which melts at 189–190° C. (with decomposition). After isolating this ester from its hydrochloride and decarboxylation thereof at 200° C. under vacuum, the 3-propionyl-N-γ-diethylaminopropyl phenothiazine is obtained of which the oxalate (light yellow crystals) melts at 147–149° C. (with decomposition).

The invention is not restricted to the details of carrying out the reactions which appear in the examples, nor to the preparation of the typical compounds mentioned therein. The process of obtaining N-aminoalkyl phenothiazines by decarboxylation of esters of phenothiazine N-carboxylic acids is of a general character.

According to a further aspect of this invention, another process is provided for preparing compounds of the N-(tertiary-aminoalkyl) phenothiazine series which bear a nuclear substituent containing a carbonyl group, i.e. a substituent which is sensitive to the action of alkalis.

According to that further aspect of my invention, I provide a process for the production of N-(tertiary-aminoalkyl) phenothiazines containing a carbonyl substituent in the nucleus which comprises treating a phenothiazine having a nuclear carbonyl substituent to effect blocking thereof, for instance by applying the conventional methods used in the chemistry of the steroids; the phenothiazine thus treated is condensed with a tertiary-aminoalkyl halide, for example in the presence of an alkaline condensation agent, and the nuclear carbonyl substituent (which had been temporarily blocked) is thereafter re-generated.

Amongst the phenothiazines suitable for the process of this invention are mentioned particularly those which have an acyl radical of a lower aliphatic acid (including formic acid) substituted in the nucleus, particularly in the 3-position.

In order to block the carbonyl substituent, a ketal of the phenothiazine in question can be prepared, for example by reacting with ethane diol, ethane dithiol or ethyl orthoformate. In this manner, a new compound is obtained which can be isolated if desired.

The condensation of the ketalised phenothiazine with the tertiary-aminoalkyl halide, particularly the chloride or bromide, can be effected in one or more inert organic solvents, such as ethers, particularly ethyl ether, and aromatic hydro-carbons, such as benzene, toluene or xylene, in the presence of an organo-lithium or organo-magnesium compound, or else lithium hydride or a mixed hydride of lithium and aluminum; the organo-lithium compound may be an alkyl lithium or an aryl lithium, such as phenyl lithium.

When the condensation with the tertiary-amino-alkyl halide has been completed, the carbonyl substituent which has been transitorily blocked can be regenerated by treating the N-(tertiary-aminoalkyl) phenothiazine compound with an acid reagent which brings about deketalisation.

A good yield is obtained of N-(tertiary-amino-alkyl) phenothiazines having a nuclear carbonyl substituent.

The invention is applicable, in particular, to the preparation of 3-acyl-N-(dialkl-aminoalkyl) phenothiazines in which the nuclear substituent is a lower acyl group and the alkyl groups are lower alkyl groups.

The process described above makes possible, in particular, to produce the compounds above mentioned and also 3-acetyl N-(β-diethylamino-ethyl) phenothiazine and its salts, which are new compounds and form part of the present invention; these compounds can be used in therapeutics. The new compound 3-acetyl N-(β-diethylamino-ethyl) phenothiazine is a substance showing a low toxicity and having a depressive activity towards central nervous system, which is evidenced for example by increasing the effect of hypnotic and anaesthetic substances; furthermore, said compound shows atropinic and adrenolytic properties. It is particularly desirable for the treatment of Parkinson's disease. Said compound may be employed as a salt thereof, preferably the oxalate thereof, where it should be administered as an aqueous solution.

The following examples illustrate my invention under the aforesaid further aspect thereof.

EXAMPLE 8

3-acetyl-phenothiazine (melting point 188–189° C.) is submitted to prolonged heating under reflux, in benzene, with excess ethylene glycol, in the presence of a small quantity of p-toluene sulphonic acid, the water produced in the course of the reaction (which forms an azeotrope with the benzene) being eliminated in a continuous manner.

The benzene solution is washed with an aqueous sodium carbonate solution to eliminate the excess of ethylene glycol and p-toluene sulphonic acid, and is then dried.

The benzene solution can be employed directly for the condensation reaction.

One can, however, isolate the ketal and, for this purpose the benzene is removed to obtain a crystalline residue of the ketal, which may be re-crystallized from methanol; the ketal is in the form of yellowish prisms, the melting point of which is 119–120° C.

To a solution of 3.1 g. of the ketal in 10 cc. of anhydrous benzene there is added a solution of phenyl lithium in benzene, which solution has been prepared in known manner in such a way as to contain an excess of 10% of phenyl lithium (in relation to the ketal). There is an exothermic reaction and the colour of the solution turns red.

After refluxing for 15 minutes, the calculated quantity (in relation to the quantity of ketal) of a solution of 1-chloro-3-dimethylamino-propane in anhydrous ether is added and the heating is continued until the colour of the solution turns to a clear yellow and a whitish precipitate of lithium chloride appears.

To bring about the decomposition of the ketal with regeneration of the carbonyl group, the reaction product is shaken with dilute hydrochloric acid, the aqueous layer is separated off and brought to 50° C. during 15 minutes. The colour of the solution turns from yellowish red to yellow.

The base is finally freed by means of caustic soda, extracted by means of ether, the ether extract is dried over sodium sulphate, the solvent is evaporated and the residue is distilled under reduced pressure. There is obtained, at a temperautre of the oil bath of 210–220° C. and under a pressure of 0.3 mm. of mercury, a yellow and viscous oil which gives, quantitatively, and acid maleate melting at 135–136° C. and identical with that which is obtained by the process described in Example 3.

EXAMPLE 9

By following the procedure of Example 8, but by replacing the 1-chloro-3-dimethylaminopropane by 1-chloro-2-diethylaminoethane, there is isolated, with just as high a yield, 3-acetyl-N-(β-diethylamino-ethyl) phenothiazine which is obtained in the form of a yellow and thick oil, having a greenish fluorescence. Its boiling point, under a pressure of 0.3 mm. of mercury, corresponds to a temperature of 220° C. for the oil bath. Its acid oxalate. after crystallisation in isopropanol, occurs in the form of a yellow crystalline powder, the melting point of which is 130° C.

I have further found that additional derivatives of the compounds above disclosed and homologues of the same are also highly desirable for therapeutic purposes.

Accordingly my invention under a still further aspect thereof comprises, in the first place, those 3-acyl N-dialkylamino-propyl phenothiazines in which the acyl radical is that of n-butyric acid or valeric acid and the dialkylamino radical is a dimethylamino or diethylamino radical; this invention further comprises acid addition salts, particularly hydrochlorides and acid maleates, quaternary ammonium salts, particularly iodomethylates, and oximes of the above phenothiazines. The new compounds provided according to this invention are useful in therapeutics. like the compounds above described, and as intermediate products.

Particularly useful are acid maleates of 3-propionyl, 3-n-butyryl and 3-valeryl N - γ - dimethylamino-propyl phenothiazines, and also 3-propionyl N-γ-dimethyl-amino-propyl phenothiazine oxime.

This invention further comprises a process for the production of the new bases cited in the foregoing paragraph, by decarboxylating dialkylamino-propyl esters of corresponding 3-acyl-phenothiazine N-carboxylic acids, according to the above disclosed, first aspect of my invention.

The esters just referred to and salts thereof, the corresponding 3-acyl phenothiazine N-carboxylic acids and chlorides thereof which are employable for producing such esters are also embraced in this invention.

This invention further comprises other 3-acyl N-dialkylamino-alkyl phenothiazines and salts thereof, which are also useful for therapeutic purposes, as will be apparent from the following description.

The following examples further illustrate my invention.

EXAMPLE 10

(a) *3-propionyl N - γ - dimethylamino-propyl phenothiazine.*—3-propionyl phenothiazine N-carboxylic acid chloride (colourless prisms melting at 156–157° C. after re-crystallization from ethyl acetate) was prepared from 3-propionyl phenothiazine and a toluene solution of phosgen as described in Example 1, as regards the corresponding 3-acetyl compound.

53 g. of the chloride of 3-propionyl phenothiazine N-carboxylic acid were heated to reflux for 8 hours with 20 g. of γ-dimethylamino-propanol dissolved in 300 ml. of acetone. The resulting acetone solution contained 3-propionyl N-γ-dimethylamino-propyl phenothiazine which could be isolated therefrom as beige crystals (hereinafter referred to) if the solution was left for crystallization.

Instead of so doing, acetone was distilled off on a water-bath, the residue made alkaline with sodium hydroxide and extracted with ether; the ethereal extract was washed with water then concentrated. The residue was taken up in 80 ml. of 1,3-dimethoxy benzene, 0.4 g. of reduced copper powder was added, and the solution was boiled until carbon dioxide evolution ceased. Dimethoxy benzene was then driven off in vacuo then the residue distilled in a retort. I thus obtained 35 g. of a red oil, boiling at 245–260° C. under 1 mm. of mercury.

The oil thus obtained was mixed with dilute hydrochloride acid, yielding an acid aqueous phase and an oily phase; the latter was extracted with ethyl acetate. The aqueous phase was separated, made alkaline with sodium hydroxide and extracted with ether. The ethereal solution was washed with water then dried over sodium sulphate, and ether driven off on a water-bath. The residue was again distilled in a retort. At 250–260° C. under a pressure of 1 mm. of mercury, 27 g. of an orange-red oil were obtained, the yield being 48% (reckoned on the acid chloride).

The hydrochloride of the γ-dimethylamino-propyl ester of 3-propionyl phenothiazine N-carboxylic acid which was produced in acetone at the beginning of the foregoing operations, formed beige crystals having a melting point of 207–209° C. (decomposition) after recrystallisation from absolute ethanol; the corresponding free base was a red-brown oil.

(b) *Acid maleate of base* (a).—To a solution of 27 g. of 3-propionyl-N-γ-dimethylamino-propyl phenothiazine in 25 ml. of ethyl acetate, a solution of 9.9 g. of maleic acid in 100 ml. of ethyl acetate was added and the mixture was boiled for a short time. After seeding yellow crystals separated out on cooling, they were drained then recrystallised from acetane. 27 grams of lemon-yellow prisms were thus obtained; M.P. 135° C.

By concentrating the mother liquor, 3.5 g. of crystals (M.P. 134° C.) were further obtained. The total amount, 30.5 g. corresponded to 84 percent of the theoretical yield.

Results of the analysis:
Calculated for $C_{20}H_{24}N_2OS.C_4H_4O_4$: C, 63.13%; H, 6.18%; N, 6.14%. Found: C, 63.0%; H, 5.9%; N, 6.15%.

The acid oxalate of base (a) prepared in the same way was obtained as light yellow crystals, melting at 147–149° C. (dec.) as indicated in Example 7.

EXAMPLE 11

(a) *3-propionyl N-γ-dimethylamino-propylphenothiazine oximine*.—5 grams of 3-propionyl N-γ-dimethylamino-propyl phenothiazine maleate and 1.6 g. of hydroxylamine hydrochloride were dissolved in 50 ml. of water, and the solution boiled for 15 minutes.

After cooling the reaction product was made alkaline with sodium hydroxide. A yellow oil separated and crystallized, the crystals were drained and recrystallized from absolute alcohol. Fine straw-yellow needles having a melting point of 165–166° C. were obtained with an almost quantitative yield.

Results of the analysis:
Calculated for $C_{20}H_{25}N_3OS$: C, 67.57%; H, 7.09%; N, 11.82%; S, 9.02%. Found: C, 68.1%; H, 7.2%; N, 9.4%; S, 8.61%.

(b) *3 - propionyl N - γ-dimethylamino-phenyl phenothiazine methiodide*.—5 grams of 3-propionyl N-γ-dimethylamino-propyl phenothiazine dissolved in 15 ml. of absolute ethanol were mixed with a solution of 2.5 ml. of methyl iodide in 8 ml. of absolute ethanol.

The mixture was left overnight for crystallization, then the crystals were filtered off and recrystallized from isopropanol; 5 g. of crystals having a melting point of 79–80° C. were thus obtained.

Results of the analysis:
Calculated for $C_{21}H_{27}ON_2Si$: C, 52.28%; H, 5.6%; N, 5.81%; S, 6.64%; I, 26.34%. Found: C, 52.2%; H, 5.3%; N, 5.68%; S, 6.45%; I, 25.5%.

EXAMPLE 12

(a) *Hydrochloride of the β-dimethylamino-propyl ester of 3-acetyl phenothiazine N-carboxylic acid*.—A mixture of 30 g. of 3-acetyl phenothiazine N- carboxylic acid chloride, 11.4 g. of 3-dimethylamino propan-2-ol and 120 ml. of anhydrous acetone was made up; the mixture warmed up spontaneously; it was boiled with reflux for 4 hours then cooled. A portion of the desired hydrochloride crystallized out and a new crop was obtained after evaporating acetone. The hydrochloride was recrystallized from absolute alcohol; the melting point thereof was 202–203° C. (dec.).

(b) *3 - acetyl N - β - dimethylamino-propyl phenothiazine*.—The ester hydrochloride (a) was dissolved in water, and sodium hydroxide was added to the aqueous solution for causing the basic ester to separate; said basic ester was extracted with ethyl acetate, the extract was washed with water and dried over sodium sulphate, then ethyl acetate was driven off. The residue was distilled in a high vacuum; during distillation, carbon dioxide evolved. A syrupy distillate was collected and taken up with a solution of 10 g. of oxalic acid in 250 ml. of water. 3-acetyl phenothiazine separated out and was filtered off. The aqueous solution was made alkaline with dilute sodium hydroxide, the base was extracted with ethyl acetate and redistilled in a high vacuum. The base was collected at 230–240° C. under a pressure of 0.5 mm. of mercury.

(c) *Acid maleate of base* (b).—The base (b) was dissolved in 50 ml. of ethyl acetate, and a solution of 5 g. of maleic acid in 20 ml. of ethyl acetate was added thereto. Big yellow crystals of acid maleate were obtained, they were soluble in water and were recrystallized from methanol (M.P. 192–193° C; yield 9 g.).

Results of the analysis:
Calculated for $C_{23}H_{26}O_5N_2S$: C, 62.9%; H, 5.88%; N, 6.33%; S, 7.24%. Found: C, 62.44%; H, 5.4%; N, 6.18%; S, 7.05%.

The oxime of base (b), prepared according to the prescription of Example 12(a), had a melting point of 158–160° C. after recrystallization from ethanol and the methiodide a melting point of 242–243° C. after recrystallization from isopropanol.

EXAMPLE 13

Starting from the acid chloride of 3-propionyl phenothiazine N-carboxylic acid instead of that of 3-acetyl phenothiazine N-carboxylic acid, and proceeding as described in Example 12, there were obtained successively:

(a) The hydrochloride of the β-dimethylamino-propyl ester of 3-propionyl phenothiazine N-carboxylic acid, melting at 154–155° C. after recrystallization from isopropanol, (b) The 3-propionyl N-β-dimethylamino-propyl phenothiazine, a thick red-yellow oil distilling at 230° C. under 0.5 mm. of mercury, (c) The acid maleate of base (b), as yellow crystals melting at 160–161° C. after recrystallization from isopropanol, (d) The oxime of base (b), as white crystals melting at 173–174° C. after recrystallization from ethyl acetate, (e) The methiodide of base (b) as yellow crystals melting at 240–242° C. after recrystallization from methanol.

EXAMPLE 14

(a) *Hydrochloride of the γ-dimethylamino-propyl ester of 3-butyryl phenothiazine N-carboxylic acid*.—Chloride of 3-butyryl phenothiazine N-carboxylic acid was produced from 50 g. of 3-butyryl phenothiazine and 200 ml. of a 20 percent solution of phosgene in toluene, by heating in an autoclave at 105–110° C. for 3 hours, driving off toluene, taking up the residue in ether, filtering and driving off ether; without isolating the chloride thus formed, said chloride was reacted in acetone with 20 g. of γ-dimethylamino-propanol in the manner described in Example 13(a). 39 grams (yield 50 percent as reckoned on 3-butyryl phenothiazine) of fine beige crystals were thus obtained; the melting point thereof after recrystallization from a mixture of isopropanol and ether was 182° C. (dec.).

3-butyryl phenothiazine (orange flakes melting at 199° C. after recrystallization from ethyl acetate) was prepared by reacting potassium hydroxide with an alcohol suspension, maintained at reflux, of 3-butyryl N-propionyl phenothiazine (melting at 113–114° C. and produced by reacting butyryl chloride with N-propionyl phenothiazine in carbon disulphide in the presence of aluminum chloride).

(b) *3-butyryl N-γ-dimethylamino-propyl phenothiazine.*—35 grams of the hydrochloride of the γ-dimethylamino-propyl ester of 3-butyryl phenothiazine N-carboxylic acid, obtained as described in Example 14(a), were dissolved in water and the solution was made alkaline in the presence of ether. The ethereal layer was decanted, washed with water, dried over sodium sulphate, then concentrated on a water-bath. The oily residue was taken up in 80 ml. of 1:3-dimethoxy benzene, 0.4 g. of reduced copper powder was added and the mixture was refluxed until carbon dioxide evolution ceased. Dimethoxy benzene was then driven off in vacuo, and the residue was distilled in a retort under a pressure of 1 mm. of mercury; 25 g. of a thick red oil boiling at 240–260° C. under 1 mm. of mercury were obtained.

The oil was taken up in dilute hydrochloric acid and the insoluble portion extracted with ethyl acetate. The aqueous phase was separated, made alkaline with sodium hydroxide and the base thus set free extracted with benzene. The benzenic solution was washed with water, dried over sodium sulphate and concentrated on a water-bath. The residue was distilled in a retort. An orange oil (15 g. yield 50 percent) was obtained at 260–270° C. under a pressure of 1 mm. of mercury.

(c) *Acid maleate of base* (b).—3.4 g. of maleic acid were dissolved in 50 ml. of ethyl acetate, 10 g. of the base obtained according to (b) were added thereto and the mixture was boiled for a short time.

On cooling and after seeding, orange-yellow prisms separated out. They were recrystallized from acetone, and 7 g. of big orange-yellow prisms (M.P. 132–133° C.) were obtained.

Results of the analysis:
Calculated for $C_{21}H_{26}ON_2S.C_4H_4O_4$: C, 63.80%; H, 6.42%; N, 5.95%. Found: C, 63.5%; H, 60%; N, 6.44%.

(d) *Oxime of base* (b).—Working in a manner similar to that described in Example 12(a) and starting from 6 g. of 3-butyryl N-γ-dimethylamino-propyl phenothiazine, 2.6 g. of hydroxylamine hydrochloride and 50 ml. of water, fine lemon-yellow needles (3.3 g.; yield 53 percent) having a melting point of 141° C. were obtained.

For analysis purposes, a sample was again recrystallized from absolute ethanol (M.P. 142° C).

Results of the analysis:
Calculated for $C_{21}H_{27}N_3OS$: C, 68.25%; H, 7.37%; N, 11.37%; S, 8.68%. Found: C, 66.0%; H, 6.9%; N, 9.20%; S, 8.50%.

EXAMPLE 15

(a) *Hydrochloride of the γ-diethylamino-proply ester of 3-butyryl phenothiazine N-carboxylic acids.*—Working in a manner similar to that described in Example 11(a) and starting from 42 g. of 3-butyryl phenothiazine, 170 ml. of a 20 percent solution of phosgene in toluene and, later on, 21 g. of γ-diethylamino propanol, 33 g. (yield 46%) of fine beige crystals of the hydrochloride named in the heading were obtained.

For the purpose of analysis, a sample of the hydrochloride was recrystallized from a mixture of isopropanol and petroleum ether. Fine colourless crystals having a melting point of 181° C. were obtained.

Results of the analysis:
Calculated for $C_{24}H_{30}N_2O_3S.HCl$: C, 62.25%; H, 6.75%; N, 6.05%; S, 6.93%; HCl, 7.88%. Found: C, 62.5%; H, 6.6%; N, 6.12%; S, 6.80%, CHl, 8.3%.

(b) *3-butyryl N-γ-diethylamino-propyl phenothiazine.*—30 grams of the hydrochloride obtained as described in (a) were dissolved in 40 ml. of water and the solution made alkaline with sodium hydroxide. The base thus set free was extracted with ether, the ethereal layer was separated, washed with water then dried over sodium sulphate. Ether was driven off on a water-bath and then the residue was distilled in a retort. There was obtained 17 g. of a red oil at 250–260° C. under a pressure of 1 mm. of mercury.

The oil was taken up in dilute hydrochloric acid. The undissolved portion was extracted with ether; the aqueous layer was separated, made alkaline with sodium hydroxide and extracted with ethyl acetate. The solution was dried over sodium sulphate then concentrated on a water bath. A red oil (14 g.; yield 57 percent) was obtained.

(c) *Acid maleate of base* (b).—In 75 ml. of boiling ethyl acetate, 4.9 g. of maleic acid were dissolved and 14 g. of base (b) were added. The whole was boiled for a short time. On cooling, yellow crystals of acid maleate separated out. They were recrystallized from ethyl acetate: 15 g. of fine gold yellow crystals having a melting point of 110–111° C. were obtained. Yield 83 percent.

Results of the analysis:
Calculated for $C_{23}H_{30}ON_2S.C_4H_4O_4$: C, 65.03% H, 6.87%; N, 6.62%; S, 6.43%. Found: C, 65.1%; H, 6.4%; N, 5.50%; S, 6.81%.

EXAMPLE 16

(a) *3-valeryl phenothiazine.*—Into a three neck flash provided with a mechanical stirring device, a dropping funnel and a reflux cooler, 534 g. of powdered aluminum chloride were introduced. A solution of 255 g. of N-propionyl phenothiazine in 900 ml. of carbon disulphide was gradually added while stirring. After the addition was ended, the mixture was heated to reflux for 2 hours then 156 g. of valeryl chloride were gradually added. The addition rate was controlled in order that reflux took place without external heating. After the end of the addition, refluxing was proceeded with for 3 hours.

After cooling, the complex was decomposed by means of ice and excess hydrochloric acid then carbon disulphide was distilled off. By heating to boiling the residue containing hydrochloric acid, the propinonyl group attached to nitrogen was split off. Upon cooling, a brown yellow solid crystallized; it was drained and washed with water.

The solid was caused to crystallize from xylene, the water retained being distilled off.

Orange-yellow flakes (193 g.; yield 68 percent) having a melting point of 199° C. were obtained.

Results of the analysis:
Calculated for $C_{17}H_{17}ONS$: C, 72.04%; H, 6.05%; N, 4.94%; S, 11.32%. Found: C, 72.3%; H, 5.8%; N, 4.93%; S, 11.30%.

(b) *Chloride of 3-valeryl phenothiazine N-carboxylic acid.*—Working in accordance with example 1 and starting from 100 g. of 3-valeryl phenothiazine and 400 ml. of a 20 percent solution of phosgene in toluene, grey green crystals were obtained which after dissolution in cyclohexane and fractionate precipitation by means of petroleum ether, yielded 40 g. of green yellow crystals having a melting point of 79° C.

(c) *Hydrochloride of the γ-dimethylamino-propyl ester of 3-valeryl phenothiazine N-carboxylic acid.*—Working in accordance with Example 15(a) and starting from 25 g. of chloride of 3-valeryl phenothiazine N-carboxylic acid and 9 g. of γ-dimethylamino-propanol, there were obtained 28 g. (yield 86 percent) of yellowish crystals which recrystallized from isopropanol yielded small, cream coloured crystals having a melting point of 186° C. (dec.).

Results of the analysis:

Calculated for $C_{23}H_{28}N_2O_3S$: C, 61.51%; H, 6.51%; N, 6.89%; S, 7.14%; HCl, 8.12%. Found: C, 60.1%; H, 6.2%; N, 6.55%; S, 6.75%; HCl, 9.10%.

(d) *3-valeryl N-γ-dimethylamino-propyl phenothiazine.*—20 grams of the hydrochloride obtained according to (c) were dissolved in 100 ml. of water and the solution was made alkaline with sodium hydroxide. The base thus set free was extracted with benzene, the benzene solution was washed with water, dried over sodium sulphate and concentrated on a water-bath. The residue was decarboxylated by heating to 200° C. under a high vacuum until the vacuum resumed its initial level; the residue was then distilled by heating to a higher temperature. Under a pressure of 0.4 mm. of mercury, 13 g. of an orange red oil which partly solidified were obtained. Ether was added thereto and the solid portion was filtered off then repeatedly washed with a small amount of ether. The ethereal solution was extracted with dilute hydrochloric acid, and the aqueous phase separated. The aqueous solution thus obtained was made alkaline with sodium hydroxide and extracted with ether. The ethereal solution was washed with water and dried over sodium sulphate, and the ethereal solution was concentrated on a water-bath. The residue was distilled again; 10 g. (yield 61%) of a red oil were obtained at 230° C. under 0.4 mm. of mercury.

(e) *Acid maleate of base (d).*—Working in accordance with Example 16(c), gold yellow prisms having a melting point of 110–111° C. were obtained with a yield of 65 percent, after recrystallizing the crude crystals from ethyl acetate.

Results of the analysis:

Calculated for $C_{22}N_{28}N_2OS.C_4H_4O_4$: C, 64.44%; H, 6.65%; N, 5.73%; S, 6.62%. Found: C, 64.2%; H, 6.3%; N, 5.9%; S, 6.43%:

(f) *Oxime of base (d).*—Working in accordance with Example 12(a) and starting from 3 g. of the acid maleate obtained according to (e) above yellow crystals were obtained which recrystallized from absolute ethyl alcohol gave 1.4 g. (yield 59%) of yellow crystals having a melting point of 142° C.

The compounds according to the last-disclosed aspect of this invention generally were found to have a lowering depressive effect upon the central nervous system and to possess other therapeutically valuable properties which will be apparent from the following table showing the outstanding pharmacological properties of typical compounds illustrative of this invention; where the bases are of oily character and/or not convenient for administration as such, they are preferably employed as acid addition salts or quaternary ammonium derivatives thereof.

As additional compound which is also embraced by this invention as broadly defined amove and is desirable for therapeutics in belonging to the class of potentiators for analgesic and narcotic agents, hypnotics, adrenolytics, spasmolytics, anti-histaminics, anti-emetics, and hypotensive agents, I shall mention 3-propionyl 10-β-diethylamino-propyl phenothiazine and the hydrochloride thereof.

According to my invention, the aforesaid compound may be prepared by condensing 3-propionyl phenothiazine, in the presence of a condensation agent of the type to be defined below, with a β-diethylamino-propyl ester, preferably the chloride or the tosylate; it is also possible to start from the product obtained by blocking the carbonyl group, for example by treatment with a primary amine, more particularly aniline or a derivative thereof, or by conversion to ketal preferably with ethylene glycol; in that case after condensation with the β-diethylamino-propyl ester, the condensation product is treated with an acid reagent with a view to regenerating the transitorily blocked carbonyl group.

The condensation is preferably carried out in inert organic diluents or solvents, such as aromatic hydrocarbons, for example benzene, toluene or xylene, or ethers having boiling points of a similar order, for example dioxane. More particularly it is desirable to effect the condensation in a dialkylformamide, especially dimethylformamide.

As condensation agents, alkali metals either in metal form or as simple or mixed hydrides, amides, hydroxides or carbonates, particularly sodium amide or sodium hydride, are preferred. Where the starting material is 3-propionyl phenothiazine in which the carbonyl group is blocked, an organo-magnesium or organo-lithium compound may also be employed as a condensation agent.

As a modification, 3-propionyl phenothiazine (the carbonyl group of which is free or blocked) may be converted to chloride of the corresponding 3-propionyl phenothiazine 10-carboxylic acid, the chloride thus produced reacted with β-diethylamino propanol, then the ester of phenothiazine 10-carboxylic acid thus produced being subjected to a decarboxylating heat-treatment as described in the beginning of this specification.

The following example is illustrative.

EXAMPLE 17

(a) *3 - propionyl 10-β-diethylamino-n-propyl phenothiazine.*—In a three neck flask provided with a mechanical stirring device, a cocked dropping funnel and a reflux cooler, 127.5 g. (0.5 mol.) of 3-propionyl phenothiazine, 750 ml. of dry toluene and 21.5 g. of sodium amide were placed. The mixture was heated under a nitrogen atmosphere until a reaction started. As ammonia began to evolve, heating was discontinued until the reaction slowed down. Then heating was resumed with reflux for 1 hour.

Thereafter 105 g. (0.5 mol. +20 percent) of 1-diethylamino 2-chloro propane were added slowly. After such addition was ended, the mixture was refluxed for 1½

| Compound | Example | Properties |
| --- | --- | --- |
| 3-Butyryl N-γ-dimethyl aminopropyl phenothiazine (or 3-butyryl promazine) acid maleate. | 14(c) | Neuroplegic, Depressive (central nervous system), Potentializer (narcosis and local anaesthesia), Adrenolytic, Hypotensive, Little toxic. |
| 3-Acetyl N-β-dimethyl-aminopropyl phenothiazine (or 3-acetyl promethazine) acid maleate. | 12(c) | Slightly depressive, Slightly adrenolytic, Parasympatholytic, Anti-histaminic, Little toxic. |
| 3-Acetyl N-β-dimethyl aminopropyl phenothiazine (or 3-acetyl promethazine) methiodide. | End of 12(c) | Depressive, Adrenolytic, Hypotensive, Parasympatholytic, Very strongly antihistaminic, Inhibitor of stomach secretion, Very little toxic. | hour. After cooling, water was added thereto, and the toluene layer separated and extracted three times with 500 ml. of 10 percent acetic acid then with 100 ml. of water.

The acid extracts were combined and made alkaline with caustic soda lye. The organic layer was extracted with ether then washed with water and dried over sodium sulphate. Ether was evaporated on a water-bath then the residue distilled in a retort. A thick red oil (114 g.) was obtained, B.P. 235–245° C. (0.25 mm. Hg). Yield 62%.

(b) *Hydrochloride of base* (a).—40 g. of base (a) were dissolved in anhydrous ether and dry hydrochloride gas was bubbled through the solution. An oily yellow-brown solid firstly precipitated and was filtered off. Hydrochloric gas bubbled again through the solution. A yellow solid precipitated; it was filtered off, washed with anhydrous ether then recrystallized from methyl ethyl ketone. Fine yellow crystals (8 g.; M.P. 198–200° C.) were obtained.

For analysis purposes, the crystals were again recrystallized from the same solvent (M.P. 200–202° C.).

Analysis: Calculated for $C_{22}H_{28}N_2OS \cdot HCl$: C, 65.24%; H, 7.22%; N, 6.92. Found: C, 64.71, 64.62%; H, 7.42, 7.45%; N, 6.41, 6.35%.

Calculated: S, 7.22%; Cl, 8.75. Found: S, 7.29, 7.51%; Cl, 8.44, 8.58%.

I have further found that, in carrying out the processes as above described, new compounds of interest for therapeutics, either as such or as intermediate products, from 3-acyl (or 3-alkylone) phenothiazines which have 4 carbon atoms or more in the acyl radical, may also be obtained.

Among the compounds thus provided according to my invention, I shall mention, inter alia, 3-n-butyryl, 3-n-valeroyl, 3-n-hexanoyl and 3-n-octanoyl promethazines, 3-n-hexanoyl promazine, 3-n-octanoyl promazine and the acid addition salts thereof, particularly those produced from pharmaceutically acceptable acids.

Among the starting materials to be employer for preparing the above compounds, the 3-acyl (or 3-alkylone) phenothiazines having 6 carbon atoms and more in the acyl radical in the 3-position are new. They may be produced, for example, by reacting a halide of the corresponding acid, having 6 carbon atoms or more in the molecule thereof, with a 10-acyl (or 10-alkylone) phenothiazine, particularly 10-propionyl phenothiazine, preferably in the presence of a Friedel-Craft catalyst, particularly aluminum chloride and in an organic medium as usually employed for Friedel-Craft syntheses, then hydrolyzing the 3,10-di-acyl compound thus formed with a view to deacylating the same selectively only in the 10-position.

The following examples will illustrate that further aspect of my invention.

EXAMPLE 18

In a flask provided with a stirring device, a cooler and a dropping funnel, 133.5 g. of aluminum chloride covered with 100 ml. of carbon disulphide were placed. A solution of 10-propionyl phenothiazine (63.5 g.) in carbon disulphide (150 ml.) was then added gradually; 44 g. of caprylyl chloride were then introduced; the reaction was little vigorous. The mixture was left standing for 24 hours at room temperature then refluxed for 12 hours on a water-bath. The reaction being completed, a portion of carbon disulphide was decanted then the aluminum chloride complex was decomposed with ice and hydrochloric acid. Extraction was effected with chloroform. The chloroform layer after being washed, decanted, dried and filtered left after concentration a residue which was distilled. An orange oil (54 g.; yield 58%) distilled at 260–265° C. (heating bath temperature) under 0.5 mm. of mercury. It was recrystallized from ethyl alcohol; M.P. 84–85° C.

The product could be saponified either with potassium hydroxide in alcoholic medium or with hydrochloride acid in acetic acid medium. It is the last-named procedure which will be particularly described.

3-octanoyl 10-propionyl phenothiazine (30 g.) was dissolved in boiling acetic acid (300 ml.); 20 percent aqueous hydrochloric acid (75 ml.) was then added. The hydrolysis product precipitated immediately. It was allowed to cool and filtered off, then recrystallized from xylene. Small gold yellow leaflets of 3-octanoyl phenothiazine (18 g.) were obtained; M.P. 191–192° C.

Working in a similar manner, 3-hexanoyl phenothiazine and 3-nonanoyl phenothiazine were obtained.

The characteristics of the three 3-acyl phenothiazines thus prepared are apparent from the following table

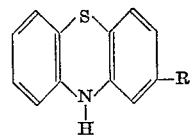

| R | Characteristics. Recrystallisation solvent | Yield | Formula and molecular weight | Analysis Calculated | Found |
|---|---|---|---|---|---|
| —CO—(CH$_2$)$_4$—CH$_3$ | Gold yellow leaflets, M.P. 190–191° C. (xylene). | 60% | $C_{18}H_{19}NOS$ = 297.396 | C% = 72.69<br>H% = 6.45<br>N% = 4.71<br>S% = 10.78 | 72.69–72.71<br>6.49–6.55<br>4.62–4.66<br>10.42–10.48 |
| —CO—(CH$_2$)$_6$—CH$_3$ | Gold yellow leaflets, M.P. 191–192° C. (xylene). | 40% | $C_{20}H_{23}NOS$ = 325.458 | C% = 73.79<br>H% = 7.10<br>N% = 4.30<br>S% = 9.85 | 73.71–73.94<br>7.13–7.21<br>4.12–4.15<br>9.57–9.64 |
| —CO—(CH$_2$)$_7$—CH$_3$ | Golden yellow leaflets, M.P. 181° C. (methyl ethylketone). | 40% | $C_{21}H_{25}NOS$ = 339.504 | C% = 74.29<br>H% = 7.42<br>N% = 4.12<br>S% = 9.44 | 74.14–74.34<br>7.38–7.41<br>4.22–4.39<br>9.37–9.44 |

In a three-neck, one litre flask provided with a stirring device, a mixture of 3-octanoyl phenothiazine (42 g.), sodium amide (10 g.) and γ-dimethylamino propyl chloride (24 g.) in dimethyl formamide (300 ml.) was maintained at 40° C. for 48 hours under a nitrogen stream. The reaction being ended, the dimethyl formamide solution was filtered and concentrated in vacuum. The residual oil was then extracted with a dilute aqueous solution of acetic acid. The unreacted starting ketone was removed. The base was salted out with sodium hydroxide and extracted with ether, then washed, decanted, dried, filtered and concentrated. The residue was distilled. 3-octanoyl 10-γ-dimethylamino-propyl phenothiazine or 3-octanoyl-promazine (42.5 g.) was obtained as an orange red oil, distilling at 265–275° C. (heating bath temperature) under 0.5 mm. of mercury.

By reacting fumaric acid with that base in ethyl acetate, I obtained the acid fumarate of 3-octanoyl promazine which recrystallized from acetone had a melting point of 121–122° C.

Working similarly, I prepared 3-hexanoyl 10-γ-dimethylamino-propyl phenothiazine. The characteristics of both bases and salts thereof are tabulated below:

formamide (400 ml.). The mixture was kept stirred at 40° C. for 24 hours. A continuous stream of nitrogen was passed over the reaction mixture to prevent possible oxidations.

After the reaction was ended, sodium chloride as produced was filtered off then as much dimethyl formamide as possible was evaporated on a water-bath. The oily residue was then treated with an aqueous solution of acetic acid. A new filtration enabled of removing unreacted valeroyl phenothiazine. The base was then again set free with sodium hydroxide and extracted with ethyl acetate. The oily layer was then decanted, washed several times, decanted again, dried over sodium sulphate, filtered and concentrated. The residual oil was distilled; 3-valeroyl 10,2′-dimethylamino-propyl phenothiazine or 3-valeroyl promethazine (51.5 g) distilled at 240–250° C. (heating bath temperature) under 0.5 mm. of mercury.

The hydrochloride thereof after recrystallization from isopropanol was obtained as small yellow prisms having a melting point of 177–178° C.

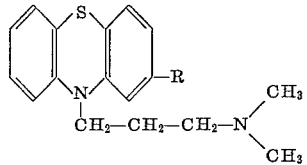

| R | Base boiling point yield | Acid salt melting point Recryst. solvent | Formula and molecular weight | Analysis | |
|---|---|---|---|---|---|
| | | | | Calculated | Found |
| —CO—(CH$_2$)$_4$—CH$_3$ | B.P.$_{0.5\text{ mm}}$=250–260° C., 78%. | Acid maleate, M.P.=134–135° C. (ethyl acetate) | C$_{27}$H$_{34}$N$_2$O$_5$S=498.654 | C%=65.16<br>H%= 6.87<br>N%= 5.62 | 64.68–64.61<br>6.86– 7.03<br>5.35– 5.40 |
| —CO—(CH$_2$)$_6$—CH$_3$ | B.P.$_{0.5\text{ mm}}$=265–275° C., 80%. | Acid fumarate. M.P.=121–122° C. (acetone) | C$_{29}$H$_{38}$N$_2$O$_5$S=526.676 | C%=66.15<br>H%= 7.27<br>N%= 5.32 | 65.95–65.79<br>7.37– 7.27<br>5.21– 5.25 |

EXAMPLE 20

In a three-neck one litre flask, 3-valeroyl phenothiazine (56 g.), sodium amide (14 g.) and 1-dimethylamino 2-chloro propane (30.4 g.) were reacted in dimethyl Similarly 3-n-butyryl promethazine, 3-n-hexanoyl promethazine and 3-n-octanoyl promethazine were prepared.

The characteristics of the above bases and salts thereof are tabulated below:

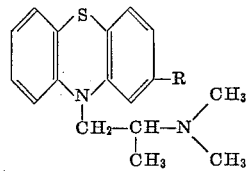

| R | Base boiling point yield | Acid salt M.P. Recryst. solvent | Formula and molecular weight | Analysis | |
|---|---|---|---|---|---|
| | | | | Calculated | Found |
| —CO—(CH$_2$)$_2$—CH$_3$ | B.P.$_{0.5\text{ mm}}$=240–250° C., 78%. | Acid maleate, M.P.=157° C. (iso-propanol). | C$_{25}$H$_{30}$N$_2$O$_5$S=470.58 | C%=63.81<br>H%= 6.43<br>N%= 5.96<br>S%= 6.82 | 63.87–63.72<br>6.71– 6.66<br>5.60– 5.75<br>6.84– 6.86 |
| —CO—(CH$_2$)$_3$—CH$_3$ | B.P.$_{0.5\text{ mm}}$=246–250° C., 70%. | Hydro-chloride, M.P.=177–178° C. (iso-propanol). | C$_{22}$H$_{29}$ClN$_2$OS=404.99 | C%=65.24<br>H%= 7.22<br>N%= 6.92<br>S%= 7.92 | 65.25–65.36<br>7.34– 7.34<br>6.72– 6.62<br>7.55– 7.70 |
| —CO—(CH$_2$)$_4$—CH$_3$ | B.P.$_{0.7\text{ mm}}$=260° C., 63%. | Hydro-chloride, M.P.=199–200° C. (iso-propanol) | C$_{23}$H$_{31}$ClN$_2$OS=419.025 | C%=65.93<br>H%= 7.46<br>N%= 6.69<br>S%= 7.65<br>Cl%= 8.46 | 65.79–65.75<br>7.46– 7.69<br>6.54– 6.42<br>7.38– 7.28<br>8.44– 8.47 |
| —CO—(CH$_2$)$_6$—CH$_3$ | B.P.$_{0.5\text{ mm}}$=260–270° C., 87%. | Hydro-chloride. M.P.=130–132° C. (ethyl acetate) | C$_{25}$H$_{35}$ClN$_2$OS=449.069 | C%=66.87<br>H%= 7.86<br>N%= 6.24<br>S%= 7.14<br>Cl%= 7.90 | 66.64–66.64<br>7.94– 8.0<br>5.78– 5.87<br>7.02– 6.93<br>7.93– 7.95 |

Although a few specific acid addition salts have been referred to in the foregoing examples, acid addition salts prepared from pharmaceutically acceptable acids, particularly hydrochloric acid, phosphoric acid, sulphuric acid, oxalic acid, maleic acid, fumaric acid, succinic acid, citric acid, tartaric acid, gluconic acid may generally be employed for therapeutic administration.

What I claim is:

1. A phenothiazine compound having the formula

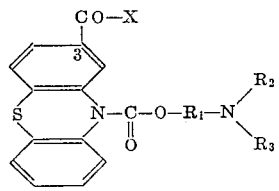

where X is an alkyl group having from 1 to 4 carbon atoms, $R_1$ is an alkylene group having from 2 to 3 carbon atoms, and $R_2$ and $R_3$ are lower alkyl groups; or an acid addition salt thereof with a pharmaceutically acceptable acid.

2. A phenothiazine compound having the formula

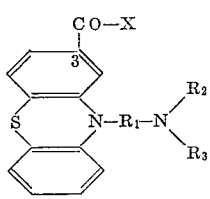

where X is an alkyl group having from 1 to 4 carbon atoms, $R_1$ is an alkylene group having from 2 to 3 carbon atoms, and $R_2$ and $R_3$ are lower alkyl groups; or an acid addition salt thereof with a pharmaceutically acceptable acid.

3. A phenothiazine compound having the formula

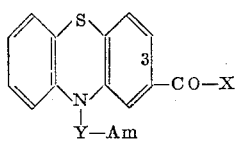

wherein X is an alkyl group having from 1 to 4 carbon atoms, Y is selected from the class consisting of ethylene group, β-methyl ethylene group and propylene group, and Am is selected from the class consisting of dimethylamino and diethylamino groups; or an acid addition salt thereof with a pharmaceutically acceptable acid.

4. A phenothiazine compound having the formula

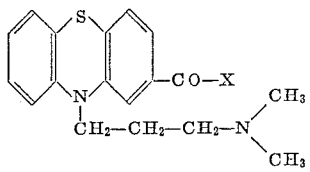

wherein X is an n-alkyl group having from 1 to 4 carbon atoms; or an acid addition salt thereof with a pharmaceutically acceptable acid.

5. A phenothiazine compound having the formula

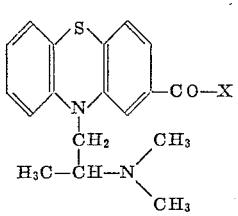

wherein X is an n-alkyl group having from 1 to 4 carbon atoms; or an acid addition salt thereof with a pharmaceutically acceptable acid.

6. N-(di-lower alkyl-amino-alkyl) 3-lower alkanoyl phenothiazine; or an acid addition salt thereof with a pharmaceutically acceptable acid.

7. N-dimethyl-aminopropyl 3-acetyl phenothiazine; or an acid addition salt thereof with a pharmaceutically acceptable acid.

8. A phenothiazine compound having the formula

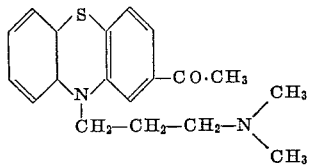

or an acid addition salt thereof with a pharmaceutically acceptable acid.

9. N-dimethyl-aminopropyl 3-propionyl phenothiazine; or an acid addition salt thereof with a pharmaceutically acceptable acid.

10. A phenothiazine compound having the formula

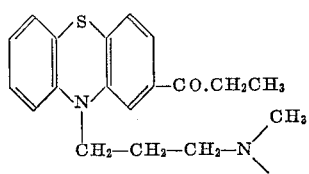

or an acid addition salt thereof with a pharmaceutically acceptable acid.

11. 3-propionyl N-(β-dimethylaminopropyl) phenothiazine; or an acid addition salt thereof with a pharmaceutically acceptable salt.

12. 3-acetyl N-(β-dimethylaminopropyl) phenothiazine; or an acid addition salt thereof with a pharmaceutically acceptable salt.

13. N-di-lower alkyl-amino-lower alkyl-3-lower-alkanoyl-phenothiazine.

14. N-ω-di-lower alkyl-amino-lower alkyl-3-lower-alkanoyl-phenothiazine.

15. N-dimethylaminopropyl 3-acetyl-phenothiazine.

16. N-dimethylaminopropyl 3-propionyl-phenothiazine.

17. N-γ-dimethylaminopropyl 3-propionyl phenothiazine.

18. N-di-lower alkyl-amino-lower alkyl ester of 3-lower-alkanoyl-phenothiazine N-carboxylic acid.

19. N-ω-di-lower alkyl-amino-lower alkyl ester of 3-lower-alkanoyl-phenothiazine N-carboxylic acid.

20. γ-Dimethylaminopropyl ester of 3-acetyl phenothiazine N-carboxylic acid.

21. β-Dimethylaminoethyl ester of 3-acetyl phenothiazine N-carboxylic acid.

22. γ-Dimethylaminopropyl ester of 3-propionyl phenothiazine N-carboxylic acid.

23. A process for the production of an N-di-lower-alkyl-amino lower alkyl phenothiazine, which comprises heating a di-lower-alkyl-amino-lower-alkyl-ester of a 3-substituted phenothiazine N-carboxylic acid until evolution of carbon dioxide has subsided, and then isolating the N-di-lower-alkyl-amino lower alkyl phenothiazine thus produced, where the 3-substituent is one that remains substantially unaffected by the decarboxylation.

24. The process of claim 23, the heating being effected under vacuum.

25. The process of claim 23, said ester being heated to reflux in a solution thereof in a solvent selected from the class consisting of decahydronaphthalene, 1:3-dimethoxybenzene, quinoline and collidine.

26. A compound selected from the group consisting of compounds having the formula

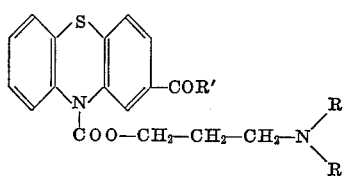

wherein R' is lower alkyl and R is selected from the group consisting of methyl and ethyl, the R's being the same.

27. Compound having the formula

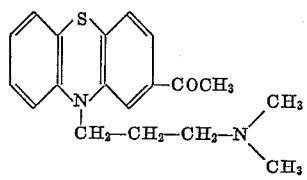

28. A process for preparation of a compound of the formula

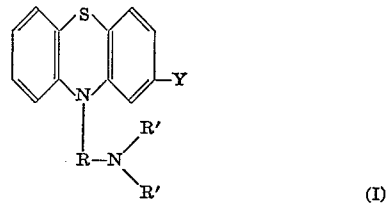 (I)

where R represents an alkylene radical of from 2 to 3 carbon atoms and R' represents an alkyl radical of from 1 to 2 carbon atoms, by heating a member of the group consisting of a carbamic acid ester of the formula

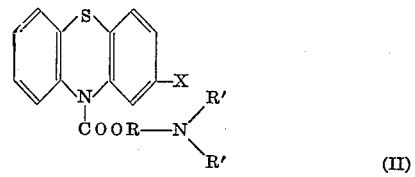 (II)

and its hydrochloride until the evolution of $CO_2$ ceases, and recovering (I) as a product, where X is a 3-substituent that remains substantially unaffected by the decarboxylation.

References Cited

UNITED STATES PATENTS

| | | | |
|---|---|---|---|
| 2,485,212 | 10/1949 | Miescher et al. | 260—243 |
| 2,645,640 | 7/1953 | Charpentier | 260—243 |

FOREIGN PATENTS 172,334  8/1952  Austria.

OTHER REFERENCES

Baltzly et al., Journ. of the Am. Chem. Soc., vol. 68, pp. 2673 to 2678 (1946).

Charpentier et al., Comptes Rendus, vol. 255, pp. 59–60 (1952).

Massie et al., J. Org. Chem., vol. 21, pp. 1006–8 (1956).

Schmitt et al., Comptes Rendus, vol. 244, pp. 255–258 (Jan. 7, 1957).

Wirth et al., Arch. Exper. Path. u. Pharmakol., vol. 232, pp. 316 to 317 (June 13, 1957).

JOHN D. RANDOLPH, *Primary Examiner.*

NICHOLAS S. RIZZO, WALTER A. MODANCE,
*Examiners.*